Figure 1:
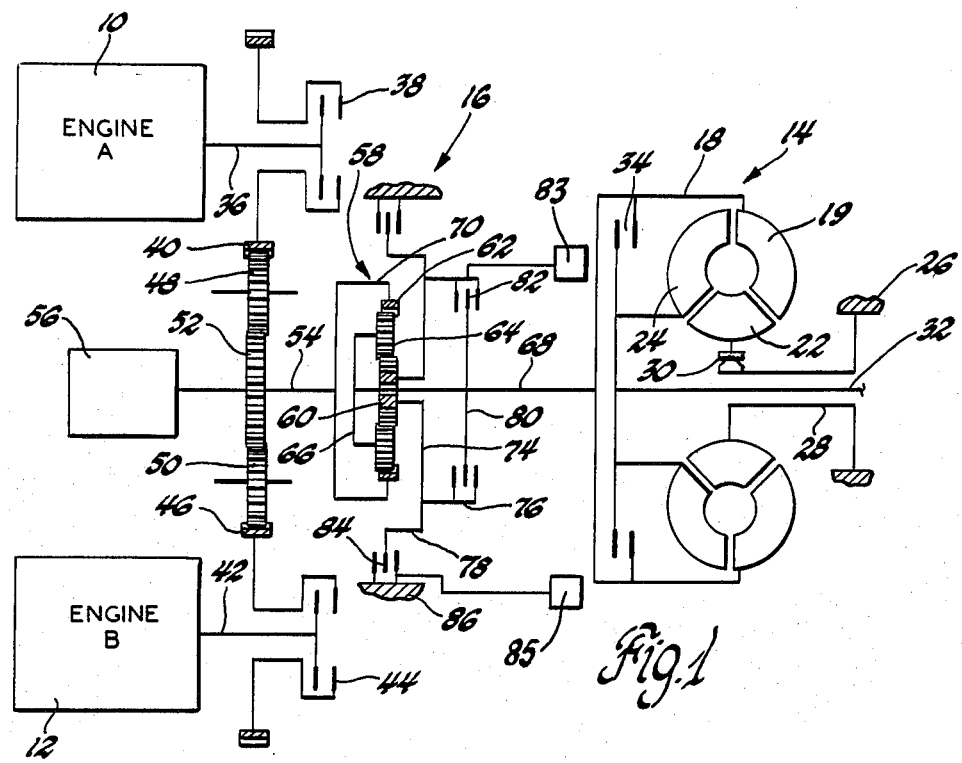

United States Patent [19]

Montgomery

[11] 4,392,393
[45] Jul. 12, 1983

[54] DUAL ENGINE DRIVE

[75] Inventor: Loren N. Montgomery, Indianapolis, Ind.

[73] Assignee: General Motors Corporation, Detroit, Mich.

[21] Appl. No.: 211,634

[22] Filed: Dec. 1, 1980

[51] Int. Cl.³ ...................... F16H 37/06; F16H 47/00
[52] U.S. Cl. .................................. 74/661; 74/665 B; 74/730
[58] Field of Search ............. 74/665 R, 665 A, 665 B, 74/674, 675, 730, 781 R, 661

[56] References Cited

U.S. PATENT DOCUMENTS

| 2,241,764 | 5/1941 | Böllinger et al. | |
| 3,194,087 | 7/1965 | Kronogard | 74/665 B |
| 3,958,465 | 5/1976 | Hiersig et al. | 74/665 A |
| 4,132,131 | 1/1979 | ReBruyne | 74/675 |
| 4,178,814 | 12/1979 | Ahlen | 74/781 R |
| 4,274,302 | 6/1981 | Herscouici | 74/665 B |

FOREIGN PATENT DOCUMENTS

| 2809479 | 10/1978 | Fed. Rep. of Germany | 74/730 |
| 55-63043 | 5/1980 | Japan | 74/781 R |
| 1540356 | 2/1979 | United Kingdom | 74/730 |

OTHER PUBLICATIONS

Publication, *Application of Hydrodynamic Drive Units to Passenger Car Automatic Transmissions* by E. W. Upton.

Primary Examiner—Kenneth Dorner
Attorney, Agent, or Firm—Saul Schwartz

[57] ABSTRACT

For a vehicle equipped with a pair of driving engines and a torque converter having a capacity sufficient to absorb the combined peak torque of the engines at combined peak torque speed, a dual engine drive including a planetary gear set operative to provide direct drive between the engines and the torque converter when both engines are operating and to provide gear reduction between the engines and the torque converter when only one engine is operating. The gear ratio of the planetary set is preselected to reduce the input speed to the torque converter while increasing the input torque to the torque converter so that the output of the one remaining engine is more efficiently matched to the torque converter.

4 Claims, 2 Drawing Figures

DUAL ENGINE DRIVE

The invention herein described was made in the course of work under a contract or subcontract thereunder with the Department of Defense.

BACKGROUND OF THE INVENTION

1. Field of the Invention

This invention relates generally to vehicles having multiple engine drive systems and in particular to an arrangement for optimizing the performance of one engine in the absence of power input from the other.

2. Description of the Prior Art

In torque converter equipped vehicles, the torque converter is typically selected or sized to absorb maximum engine horsepower with its turbine or output stalled and at an engine speed or torque converter input speed corresponding to the peak torque engine speed. This insures that maximum engine horsepower will be available when the vehicle encounters operating conditions requiring maximum horsepower, as for example in surmounting a particularly steep grade. In some vehicles, such as heavy track laying type vehicles, high horsepower requirements and space limitations can combine to render a dual engine drive, as opposed to one very large engine, most desirable. In such a vehicle the power output of the dual engine arrangement is combined and delivered to a single torque converter sized to absorb the maximum dual engine power output. While this arrangement is satisfactory under dual engine operating conditions, interruption of power flow from one engine results in a capacity mismatch between the remaining engine and the torque converter and less than optimum utilization of what horsepower is available from the remaining engine. For example, with the converter turbine stalled or nearly stalled, the single engine would be lugged down below peak torque engine speed into an inefficient operating range so that continued operation on one engine, as might be necessary to return the vehicle to a service area for repair, would require that the engine operate in its least desirable speed range. A dual engine drive according to this invention represents an advance over other dual engine arrangements by virtue of its ability to make the most efficient use of the one active engine.

The primary feature, then, of this invention is that it provides a novel dual engine drive for a torque converter equipped vehicle, the novel drive permitting optimum operation of one engine in the absence of power input from the other. Another feature of this invention is that it provides a novel dual engine drive incorporating a gear transmission between the engines and the torque converter operative in the absence of power input from one engine to transform the power output of the remaining engine at constant horsepower to a lower speed and higher torque thereby to more efficiently match the torque converter. Still another feature of this invention resides in the provision in the novel dual engine drive of a two speed gear transmission between the engines and the torque converter having direct drive ratio for normal dual engine operation and a reduction ratio operative in the absence of power input from one engine to convert the power output of the other engine to lower speed and higher torque at constant horsepower thereby to more efficiently match the capacity of the torque converter while still maintaining optimum engine performance. A still further feature of this invention resides in the provision in the novel dual engine drive of a combining gear set for directing the power output of either or both engines to a single shaft, a planetary gear set having its ring gear driven by the single shaft, its planet carrier connected to the torque converter input shaft, and its sun gear selectively connectable to either the carrier, to provide direct drive for normal dual engine operation, or to a fixed portion of the transmission, to effect gear reduction in the absence of power input from one engine.

Figure 2:
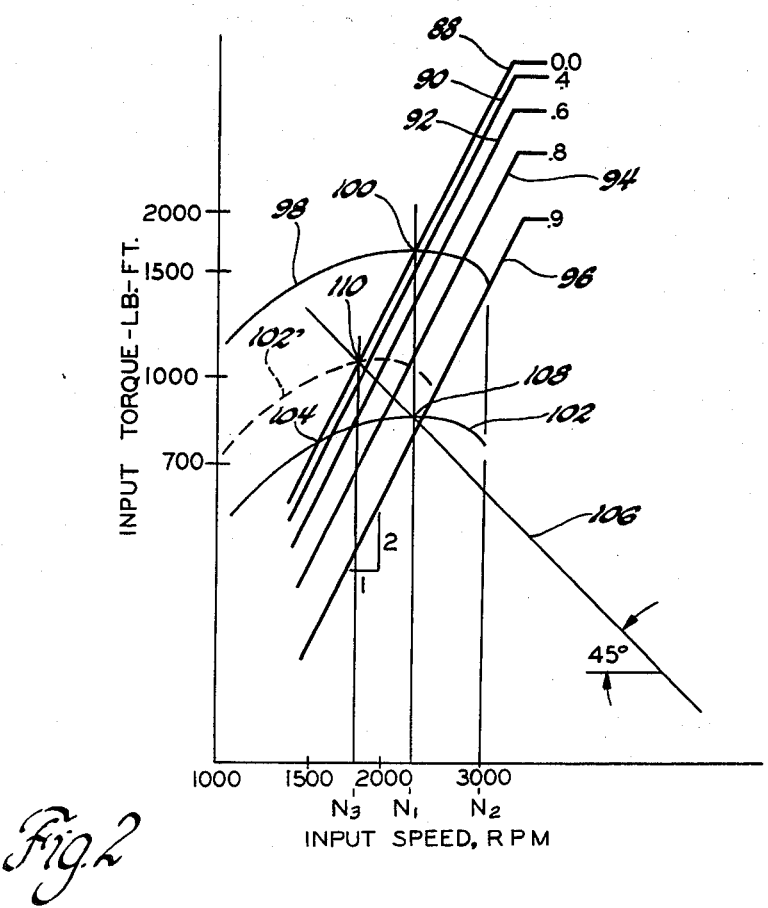

These and other features of this invention will be readily apparent from the following specification and from the drawings wherein:

FIG. 1 is a schematic view of a portion of the power train of a vehicle having a dual engine drive according to this invention; and FIG. 2 is a torque converter absorption chart relating input speed and input torque for various torque converter speed ratios, the chart having superimposed thereon torque curves representing normal dual engine drive, single engine drive without gear reduction, and single engine drive with gear reduction.

Referring now to FIG. 1 of the drawings, there shown in schematic representation is a portion of the power train of a vehicle having a dual engine drive according to this invention, the power train including a first engine 10, a second engine 12 and a torque converter 14. As more fully described hereinafter, the engines 10 and 12 are connected to the torque converter 14 through a gear transmission 16, the gear transmission 16 and the torque converter 14 constituting a dual engine drive according to this invention. The torque converter 14 may be of any conventional design and, for simplicity, is shown as a typical three element unit with torque converter clutch. In particular, the torque converter 14 includes a pump 18 having a plurality of impellers 19, a stator 22, and a turbine 24. In well-known manner the stator 22 is grounded to a fixed portion of a vehicle, as indicated at 26, by a stator shaft 28 through a one-way or overrunning clutch 30. Similarly, in known manner, the turbine 24 is rigidly connected to a torque converter output shaft 32. A torque converter clutch 34 is disposed between the pump 18 and the turbine 24 and is selectively operable to rigidly connect the pump and the turbine, thereby providing direct connection between the pump and the converter output shaft 32.

The engines 10 and 12 may be of any conventional design capable of synchronous or equal speed operation. The engine 10 has an output shaft 36 connected by a clutch 38 to an output gear 40. Similarly, the engine 12 has an output shaft 42 connected by means of a clutch 44 to an output gear 46. In well-known manner the clutches 38 and 44 are selectively operable to rigidly connect the gears 40 and 46 to the output shafts 36 and 42, respectively. Output gear 40 meshingly engages an idler gear 48 while the output gear 46 meshingly engages an identical idler gear 50. The idler gears 48 and 50 each meshingly engage a combining center gear 52 rigidly supported on a first intermediate shaft 54. The gears 40, 46, 48, 50 and 52 comprise a portion of the gear transmission 16 and the first intermediate shaft may, if desired, be adapted to operate directly an accessory device 56, as for example a power takeoff or hydraulic pump.

With continued reference to FIG. 1, the gear transmission 16 further includes a planetary gear set 58 disposed between the torque converter 14 and the combining center gear 52 having a sun gear 60, a ring gear 62 and a plurality of planet gears 64 meshingly engaging the ring and the sun gears. The planet gears are rotatably supported on a planet carrier 66 which carrier is rigidly connected to a second intermediate shaft 68 which, in turn, is rigidly connected to the pump 18 of the torque converter 14. The ring gear 62 is connected to a drum 70 which, in turn, is connected to the first intermediate shaft 54. The sun gear 60 is connected to an annular member 74 having a first drum portion 76 and a second drum portion 78. A disc member 80 attached to the second intermediate shaft 68 is disposed between the latter and first drum portion 76 and is selectively connectable to the latter by a rotating clutch 82. Conventional hydraulic control means for rotating clutch 82 are schematically illustrated at 83 and function in well known manner to selectively connect friction discs rotating with drum portion 76 and friction discs rotating with disc member 80. A rotary brake 84 disposed between a fixed portion of the vehicle designated 86 and the second drum portion 78 is selectively operable to rigidly attach the annular member 74, and hence the sun gear 60, to the fixed portion 86 of the vehicle. Conventional hydraulic control means for rotary brake 84 are schematically illustrated at 85 and function in well known manner to selectively connect friction discs rotating with second drum portion 78 and friction discs non-rotatably connected to the fixed portion 86 of the vehicle.

Describing now the operation of the dual engine drive, in a typical installation the engines 10 and 12 are of equal horsepower and operated synchronously to each provide one half of the total power input to the torque converter. Under normal conditions the clutches 38 and 44 are engaged to transfer the power supplied by the engines 10 and 12 to the first intermediate shaft 54 through the combining gear train made up of the gears 40, 46, 48, 50 and 52. Of the total horsepower supplied by the two engines, a portion is consumed by the accessory device 56 if so equipped so that the net horsepower of the two engines 10 and 12 is delivered by the first intermediate shaft 54 to the planetary gear set 58. With both engines operating, the rotating clutch 82 is engaged to couple the sun gear 60 and the planet carrier 66 thereby effectively unitizing the planetary set to provide direct drive so that the second intermediate shaft 68 is rigidly connected to the first intermediate shaft 54. Accordingly, the net horsepower of the two engines 10 and 12 is delivered at engine speed to the pump 18 of the torque converter 14. The torque converter 14, in well-known manner, multiplies the torque delivered by second intermediate shaft 68 in continuously variable fashion to provide usable torque output at the torque converter output shaft 32 which, of course, is connected to the input shaft of the main vehicle transmission, not shown.

Under partial power operating conditions, as for example when one of the engines 10 and 12 fails or when one of the clutches 38 and 44 is selectively disengaged, the power output of the remaining engine is transferred to the combining gear 52 through the still engaged one of the clutches 38 and 44 and the corresponding ones of the gears 40, 46, 48 and 50 as described hereinbefore. For reasons more fully described hereinafter, under partial power operating conditions the rotary clutch 82 is disengaged and the rotary brake 84 is engaged, thereby grounding the sun gear 60 of the planetary set 58. The partial engine power at combining gear 52 is then transferred to the ring gear 62 through the first intermediate shaft 54 and the drum 70. With the sun gear 60 grounded the planet carrier 66 is caused to rotate in the same direction as the ring gear 62 but at a slower speed so that the power output at second intermediate shaft 68 is effectively the same as at first intermediate shaft 54 but at slower speed and higher torque. The slower speed-higher torque at second intermediate shaft 68 is then transferred to the torque converter pump and, as described hereinbefore, on to the main transmission of the vehicle.

Referring now to FIG. 2, the representative torque converter absorption chart thereshown provides graphic illustration of the operation of the dual engine drive according to this invention. Torque converter absorption charts show, for individual converter units, the relationship between converter input speed and converter input torque for various converter speed ratios, the speed ratio being the converter output speed divided by the converter input speed. When plotted on graph paper having ordinate and abscissa scales divided logarithmically, as in FIG. 2, input speed and input torque exhibit a straight line relationship for each selected speed ratio, the lines extending upward and to the right at a 2 to 1 slope. Accordingly, lines 88, 90, 92, 94 and 96 in FIG. 2 represent the input speed-input torque relationships at speed ratios of 0.0 (converter turbine stalled), 0.4, 0.6, 0.8, and 0.9, respectively, for the torque converter 14.

Now, assuming for simplicity no horsepower loss at the power take off 56 or in the gear transmission 16, the total combined torque output of the two engines 10 and 12 is equal to the converter torque input. Similarly, the output speed of the two engines 10 and 12 is equal and, assuming for the moment direct drive through the gear transmission, equals the converter input speed. For the combined engines 10 and 12 there is a characteristic relationship between engine torque and engine speed which can be plotted or superimposed on the absorption chart, the plot producing a combined engine torque curve 98. As seen in FIG. 2, the combined engine torque curve 98 shows that engine torque increases with increasing speed up to peak torque engine speed designated $N_1$ and thereafter falls slightly as engine speed increases from peak torque engine speed to maximum engine speed designated $N_2$. In "matching" the torque converter to the engines 10 and 12, the converter is selected such that the combined engine torque curve 98 intersects the line 88 corresponding to zero speed ratio (converter turbine stalled) generally at the point of peak engine torque which, of course, occurs at the peak torque engine speed $N_1$. For the combined engine torque curve 98, this point of intersection is designated 100. Accordingly, the torque converter 14 will absorb the maximum combined torque of the engines 10 and 12 at peak torque speed $N_1$.

With continued reference to FIG. 2, also superimposed on the torque converter absorption chart is an individual engine torque curve 102 depicting the relationship between torque and speed for either of the engines 10 and 12. Of course, since the engines 10 and 12 are identical and synchronously operated, the torque curve 102 is identical to the combined torque curve 98 but displaced downward on the graph because the torque output of either individual engine is one-half of the total. It will be apparent from the relationship between the torque curve 102 and the lines 88, 90, 92, 94 and 96 for the torque converter 14, that a significant mismatch exists. In particular, the intersection between the line 88 representing zero speed ratio (converter turbine stalled) and the torque curve 102 occurs at a point 104 corresponding to an engine speed significantly below peak torque engine speed $N_1$. Accordingly, if the vehicle were to be operated on a single engine and encounter resistance to movement sufficient to load the torque converter enough to lower the speed ratio below about 0.90, the engine would be loaded or lugged down to a speed below peak torque engine speed, such operation being inefficient and not desirable.

To avoid the condition just described, the planetary gear set 58 incorporates a predetermined gear ratio which in effect functions to shift the single engine torque curve 102 to a location wherein the line 88 corresponding to zero speed ratio (converter turbine stalled) intersects the engine curve at peak engine torque. More particularly, each point along the curve 102 represents a finite torque-speed relationship for the one operating engine which produces a corresponding finite horsepower value. Furthermore, the relationship between torque and speed for constant horsepower, when plotted on logarithmic ordinate and abscissa scales, produces a straight line oriented diagonally downward from left to right at an angle of 45° to the horizontal. Thus, on the absorption chart of FIG. 2 a line 106 plotted at 45° through the intersection 108 of the peak torque engine speed $N_1$ and the engine torque curve 102 describes the relationship between speed and torque which will always produce the horsepower generated by the one remaining engine at peak torque engine speed.

To arrive at the gear ratio for the planetary gear set 58 it is necessary to first find the intersection between the line of constant horsepower 106 and the line 88 corresponding to zero speed ratio (converter turbine stalled), the intersection occurring at 110 in FIG. 2. At zero speed ratio (converter turbine stalled), the horsepower input to the converter at point 110, which is the peak torque horsepower produced by the remaining engine at peak torque speed, corresponds to a converter input speed $N_3$, $N_3$ being lower than peak torque engine speed $N_1$. The gear ratio necessary to change $N_1$ to $N_3$ is, of course, equal to $N_1$ divided by $N_3$. Knowing, then, the desired gear ratio it becomes a question of gear design whereby gearing of proper torque capacity is provided between the combining gears and the torque converter to step up the engine torque while stepping down the input speed. By interposing this reduction gearing between the remaining operating engine and the torque converter, the engine torque curve 102 is, in effect, translated upward and to the left as viewed in FIG. 2 to the position 102' wherein torque and speed are more properly matched to the torque converter while the remaining engine is operated in its most efficient operating range between the peak torque engine speed $N_1$ and the maximum engine speed $N_2$.

It will be apparent to those skilled in the art that while an equal power synchronously operated engine pair has been described, the dual engine input drive according to this invention is also applicable to synchronously operated engine pairs of unequal power. For example, where a vehicle at relatively infrequent times requires total dual engine power and at other more frequent times requires only 75% of total power, it may be advantageous to provide an engine pair wherein one engine provided 75% of total power and the other engine provides 25% of total power. The torque converter would, of course, be sized for total horsepower so that with the 25% power engine shut down a mismatch would exist between the 75% power engine and the torque converter. By providing reduction gearing, then, between the 75% power engine and the torque converter, as described hereinbefore, the mismatch can be effectively eliminated so that the 75% power engine will always operate in its most efficient speed range.

The embodiments of the invention in which an exclusive property or privilege is claimed are defined as follows:

1. In a vehicle including a pair of synchronously operated engines each producing individual peak torque at substantially identical individual peak torque engine speeds, combining gear means between said pair of engines operative to combine the torque output of said pair of engines, said pair of engines producing combined engine peak torque at combined engine peak torque speed substantially equal to said individual peak torque engine speeds, and a torque converter the input torque absorption capacity of which at zero speed ratio and input speed substantially equal to said combined engine peak torque speed equals said combined engine peak torque, the combination comprising, selectively engageable direct drive means between said combining gear means and said torque converter operative to deliver to said torque converter combined engine torque at combined engine speed, selectively engageable reduction gear means between one engine of said pair of engines and said torque converter having a preselected gear ratio operative at a speed input equal to said individual peak torque engine speed and a torque input equal to said individual peak torque to reduce speed to a lower speed output whereat the corresponding higher torque output substantially equals the torque capacity of said torque converter at zero speed ratio when the torque converter input speed equals said lower output speed, and means operative to effect selective engagement of one said reduction gear means and said direct drive means.

2. The combination recited in claim 1 wherein said selectively engageable reduction gear means is planetary gear set.

3. In a vehicle including a pair of synchronously operated engines each producing individual peak torque at substantially identical individual peak torque engine speeds, combining gear means between said pair of engines operative to combine the torque output of said pair of engines, said pair of engines producing combined engine peak torque at combined engine peak torque speed substantially equal to said individual peak torque engine speeds, and a torque converter the input torque absorption capacity of which at zero speed ratio and input speed substantially equal to said combined engine peak torque speed equals said combined engine peak torque, the combination comprising, a planetary gear set including a sun gear and a ring gear and a plurality of planet gears meshingly engaging said sun and said ring gears, a planet carrier rotatably supporting each of said planet gears, means connecting said combining gear means to a first one of said sun gear and said ring gear and said planet carrier, means connecting a second one of said sun gear and said ring gear and said planet carrier to said torque converter, selectively operable clutch means disposed between any two of said sun gear and said ring gear and said planet carrier operative to unitize said planetary gear set thereby to provide a path of direct drive between said combining gear means and said torque converter, selectively applicable brake means between a fixed portion of said vehicle and a third one of said sun gear and said ring gear and said planet carrier operative to brake said third one of said ring gear and said sun gear and said planet carrier thereby to provide a gear reduction path between said combining gear means and said torque converter, means for selectively operating said clutch means when each of said pair of engines is providing torque input to said combining gear means so that said combined engine torque is delivered to said torque converter at combined engine speed, and means for selectively applying said brake means when only one engine of said pair of engines is providing torque input to said combining gear means, said planetary gear set with said brake applied having a preselected gear ratio operative at a speed input equal to said individual peak torque speed of said one engine and a torque input equal to said individual peak torque of said one engine to reduce speed to a lower speed output whereat the corresponding higher torque output substantially equals the torque capacity of said torque converter at zero speed ratio when the torque converter input speed equals said lower output speed.

4. The combination recited in claim 3 wherein said first one and said second one and said third one of said sun gear and said ring gear and said planet carrier is said ring gear and said planet carrier and said sun gear respectively.

* * * * *